Patented Oct. 8, 1929

1,730,960

UNITED STATES PATENT OFFICE

FRITZ WÜST, OF DÜSSELDORF, GERMANY

PURIFYING PIG IRON

No Drawing. Application filed June 30, 1927, Serial No. 202,764, and in Germany July 17, 1926.

This invention has for its object to purify pig iron produced in the coke blast furnace especially from phosphorus and sulphur in such a manner that it is far superior in purity even to the Swedish pig iron produced in the charcoal blast furnace.

The said object is attained according to the invention by treating the pig iron in a continuous operation with a slag acting according to the counter current principle.

The process may for instance be carried out in the following way.

A suitably heated rotary tubular furnace, the waste gases of which are utilized for preheating the air of combustion or generating steam and which is provided in one of its heads with a tap hole closed from the outside by means of a plug, is filled with liquid pig iron produced in the coke blast furnace and therefore strongly contaminated with phosphorus and sulphur. A slag is then produced on the pig iron from lime and iron ores. Thereupon the rotary furnace is set rotating. During the rotation of the furnace the slag enters into action on the pig iron and removes most of the phosphorus and sulphur contained in the pig iron from the same. As the rotation of the furnace causes always other slag parts to come into contact with other metal parts, the reaction between the constituents of the slag and the pig iron takes place in a much shorter time and to a much more complete extent than in case a slag acts on an iron bath in a fixed hearth. As soon as the action of the slag is finished, the furnace is stopped, the slag is tapped as completely as possible through the tap hole in the one head wall and in its stead a fresh slag is produced on the pig iron which contains still a certain amount of phosphorus and sulphur. The rotary furnace is then again set rotating so that the second slag will now act on the pig iron in a manner corresponding to that described above. Upon the fresh slag having removed from the pig iron the last remnant of foreign matters with the exception of the carbon, the rotary furnace is stopped in a position in which part of the pig iron now completely purified may be tapped through the top hole, while the slag which is not yet exhausted, is left in the furnace. After the tapping of the purified pig iron the furnace is immediately filled with another charge of impure pig iron coming from the coke blast furnace and set rotating again, so that the reaction between the slag and pig iron recommences and causes the ferric oxide to be largely reduced from the slag. As soon as the slag becomes exhausted in the course of this reaction it is tapped in the above-stated way and replaced by a fresh slag which in its turn removes from the pig iron the last remnant of the foreign matters with the exception of the carbon. The process is continued so that a pig iron bath rich in phosphorus and sulphur acts on a slag already somewhat exhausted, whereupon the entirely exhausted slag is removed and a fresh slag rich in protoxide is caused to act on the liquid pig iron now low in phosphorus and sulphur.

The main advantage of the process described resides in that it affords the possibility of supplying for the manufacture of steel a pig iron coming from the coke blast furnace and being with regard to its purity far superior to the purest pig iron of the charcoal blast furnace. The process has the further advantage that—in contradistinction to processes already known for the purification of steel—it may be carried out in a continuous operation and by the use of a single furnace and that, owing to the special construction of the furnace used, the intended purification may be attained in a very quick and thorough way.

Having described my invention, I claim:

1. The process of purifying pig iron which consists in causing a pig iron solution rich in phosphorus and sulphur to act on a lime iron-ore slag already somewhat exhausted until the same is entirely exhausted at such a temperature that the carbon content is not substantially diminished, tapping the exhausted slag and replacing it by a fresh lime iron-ore slag, causing this fresh slag rich in protoxide to remove from the liquid pig iron the rest of the phosphorus and sulphur at the aforesaid temperature, and thereupon tapping the purified pig iron and replacing it by non-purified pig iron.

2. The process of purifying pig iron which consists in causing a pig iron solution rich in phosphorus and sulphur to act in a rotary furnace on a lime iron-ore slag already somewhat exhausted until the same is entirely exhausted at such a temperature that the carbon content is not substantially diminished, tapping the exhausted slag and replacing it by a fresh lime iron-ore slag, causing this fresh slag rich in protoxide to remove from the liquid pig iron the rest of the phosphorus and sulphur at the aforesaid temperature, and thereupon tapping the purified pig iron and replacing it by non-purified pig iron.

In testimony whereof the foregoing specification is signed at Cologne, Germany, this 31st day of May, 1927.

FRITZ WÜST.